United States Patent
Paquet

(10) Patent No.: US 6,628,023 B1
(45) Date of Patent: Sep. 30, 2003

(54) MOTOR VEHICLE ALTERNATOR WITH WINDING INSULATED FROM THE HOUSING

(75) Inventor: Laurent Paquet, Creteil (FR)

(73) Assignee: Valeo Equipment Electriques Moteur, Creteil (FR)

( * ) Notice: Subject to any disclaimer, the term of this patent is extended or adjusted under 35 U.S.C. 154(b) by 0 days.

(21) Appl. No.: 09/486,790

(22) PCT Filed: Jul. 2, 1999

(86) PCT No.: PCT/FR99/01591

§ 371 (c)(1),
(2), (4) Date: Jun. 26, 2000

(87) PCT Pub. No.: WO00/02301

PCT Pub. Date: Jan. 13, 2000

(30) Foreign Application Priority Data

Jul. 2, 1998 (FR) .............................................. 98 08455

(51) Int. Cl.[7] .............................................. H02K 11/00
(52) U.S. Cl. ......................................... 310/71; 310/260
(58) Field of Search ........................... 310/71, 89, 254, 310/260, 43, 91, 179, 45, 194; 336/192; 29/596–598, 605; 264/272.11, 272.19, 272.2

(56) References Cited

U.S. PATENT DOCUMENTS

| | | | | |
|---|---|---|---|---|
| 2,583,804 A | * | 1/1952 | Andrus | 310/260 |
| 3,002,119 A | | 9/1961 | Lindstrom | 310/89 |
| 3,502,917 A | * | 3/1970 | Bizoe | 310/71 |
| 3,979,822 A | * | 9/1976 | Halm | 310/89 |
| 3,984,712 A | | 10/1976 | Hill | 310/71 |
| 4,658,164 A | | 4/1987 | Gotoh | 310/89 |
| 5,508,571 A | * | 4/1996 | Shafer, Jr. | 310/71 |
| 5,877,572 A | * | 3/1999 | Michaels et al. | 310/179 |

FOREIGN PATENT DOCUMENTS

| | | |
|---|---|---|
| DE | 31 44 110 | 5/1983 |
| DE | 33 10 289 | 9/1984 |
| DE | 34 42 348 | 5/1986 |
| EP | 0 777 312 | 11/1996 |
| WO | 97 26700 | 7/1997 |

OTHER PUBLICATIONS

Patent Abstracts of Japan, vol. 1995, No. 11, Dec. 26, 1995 & JP 06 000191, Jun. 1, 1994.

* cited by examiner

Primary Examiner—Tran Nguyen
(74) Attorney, Agent, or Firm—Morgan & Finnegan, LLP

(57) ABSTRACT

A vehicle alternator comprising a case, a stator winding, and an electrically-insulating element interposed between the case and the winding, the insulating element being a solid body mounted on one of the case and the winding. The insulating element has at least one duct extending through an orifice in the case.

23 Claims, 3 Drawing Sheets

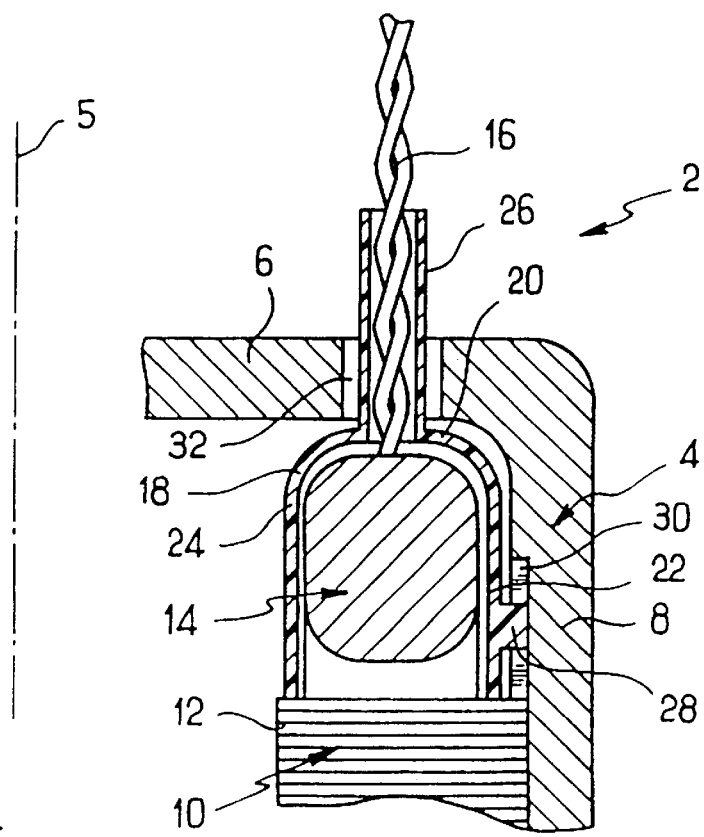
FIG_1
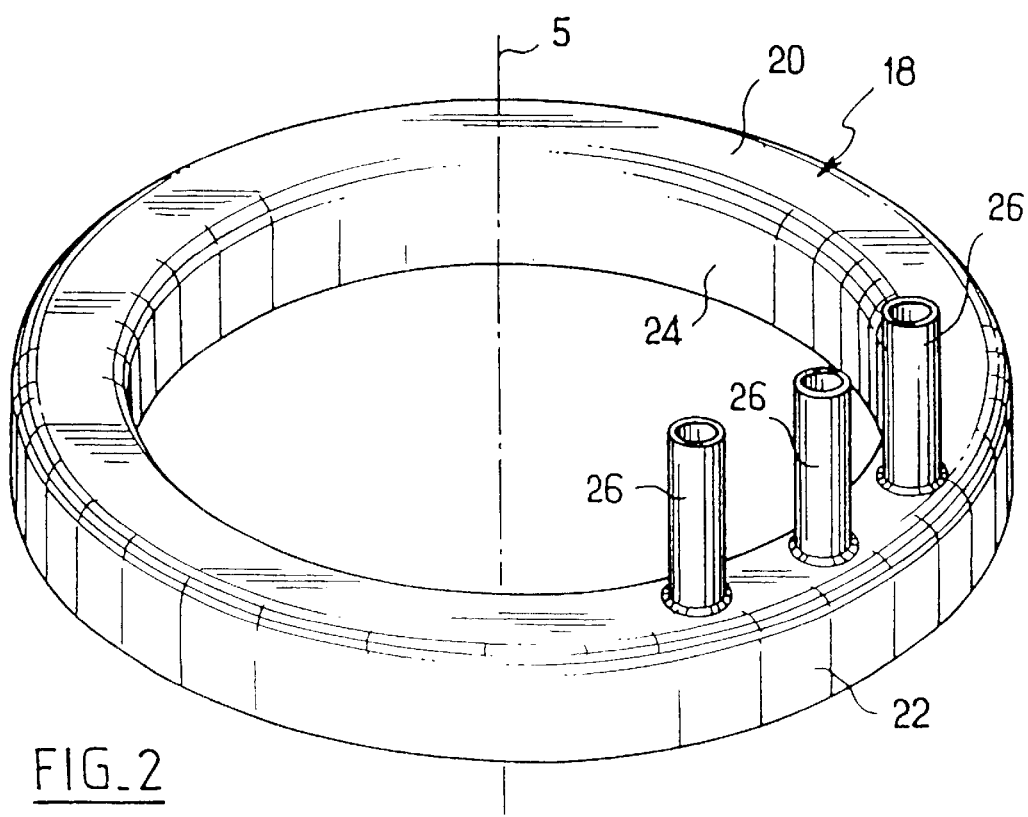
FIG_2

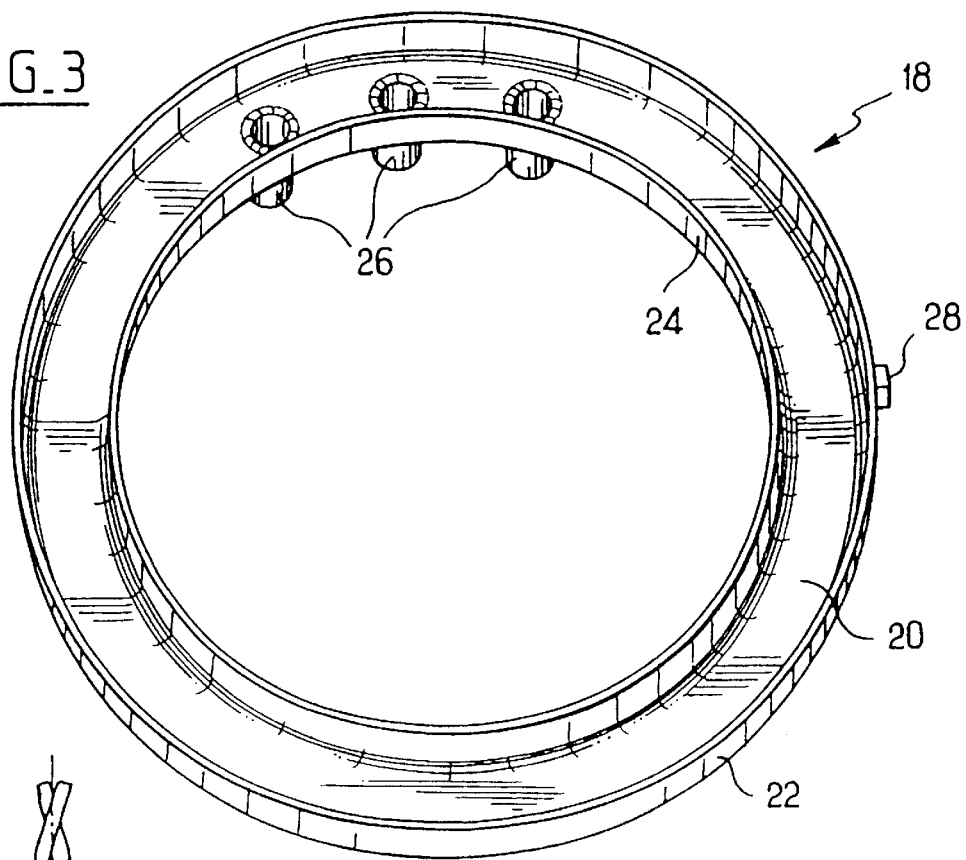
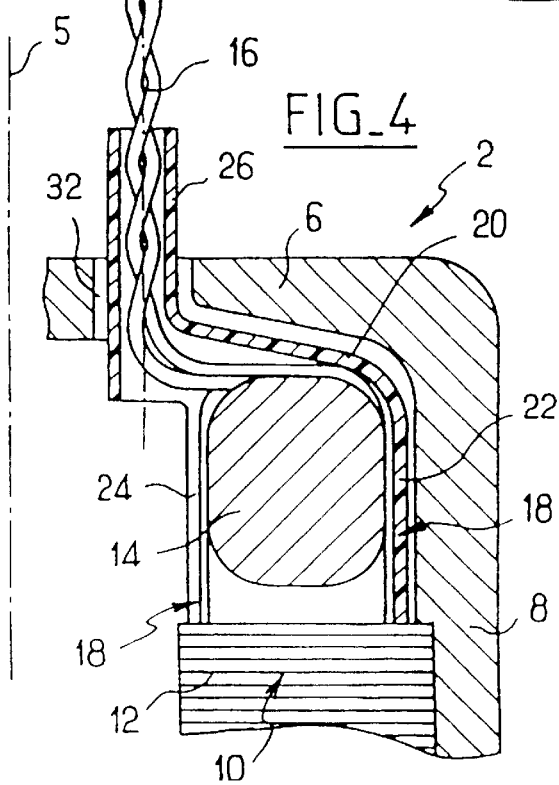
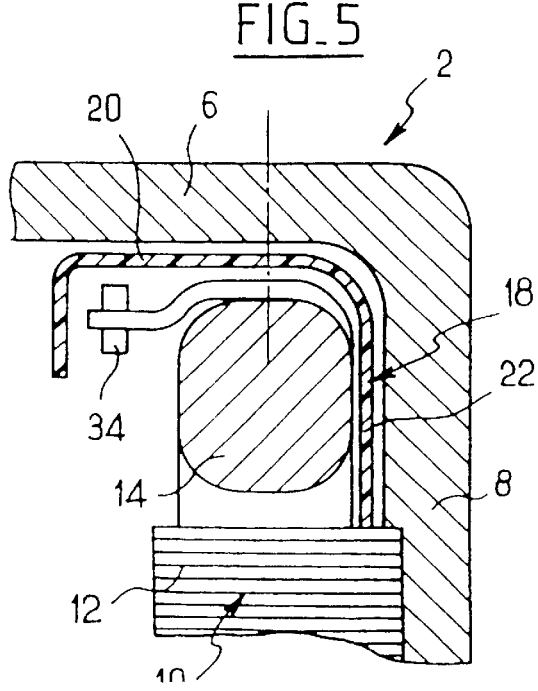

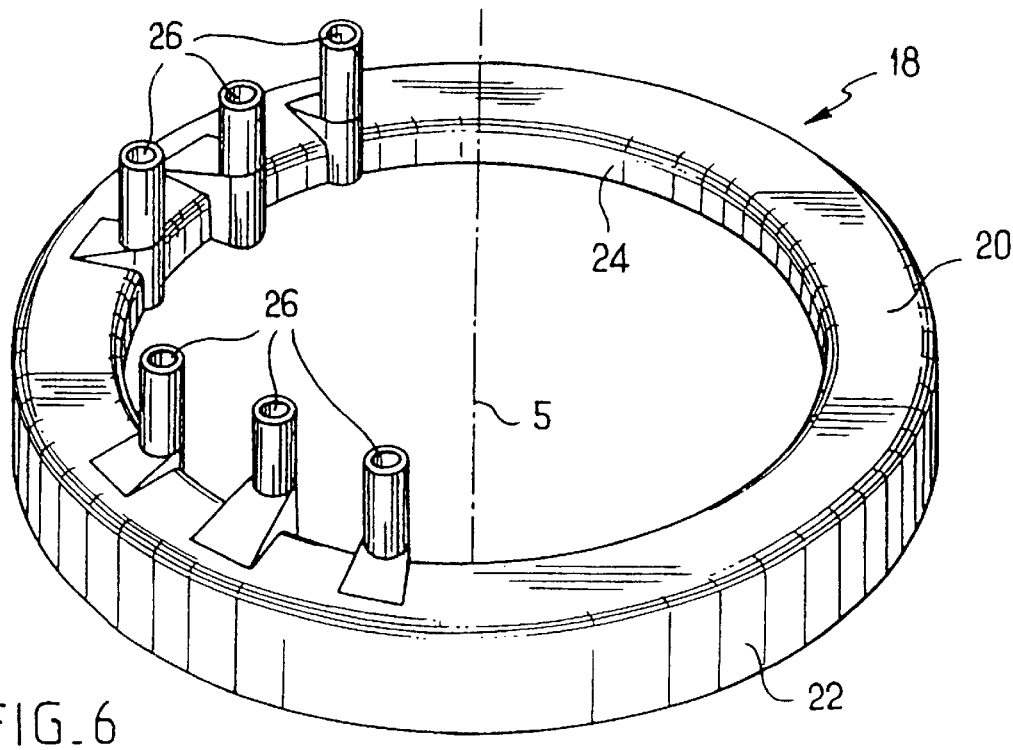
FIG_6
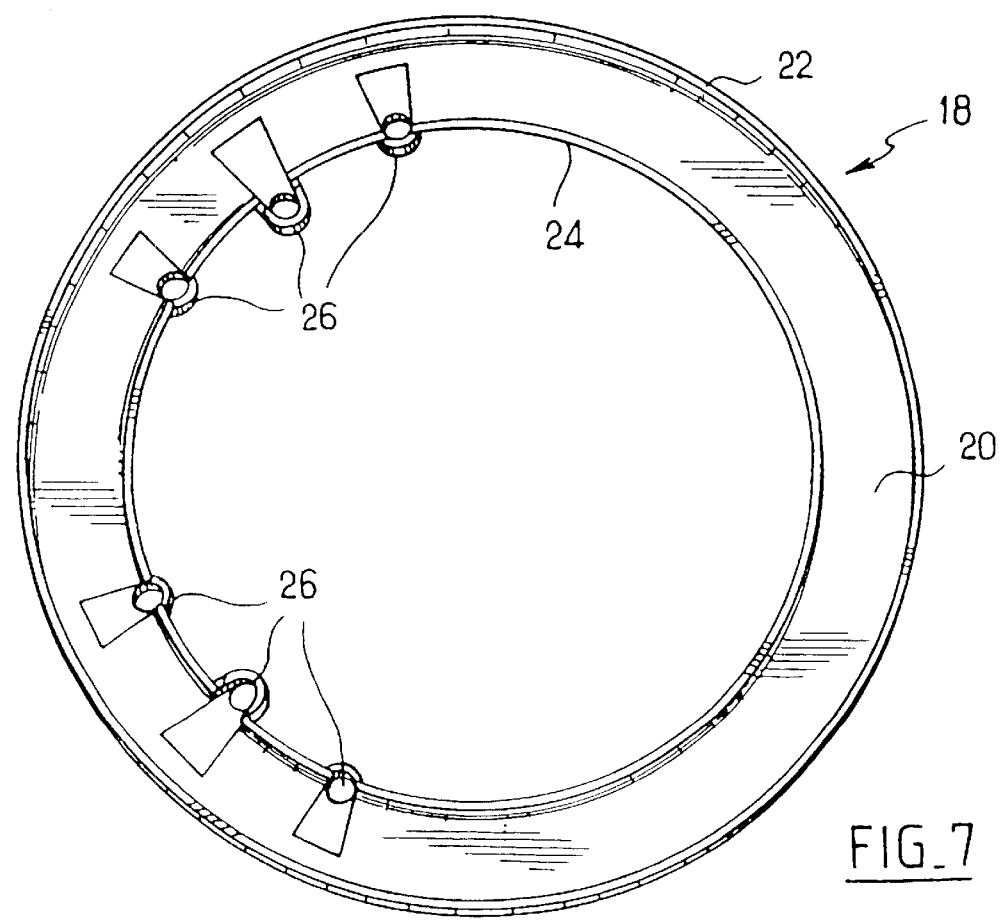
FIG_7

MOTOR VEHICLE ALTERNATOR WITH WINDING INSULATED FROM THE HOUSING

BACKGROUND OF THE INVENTION

The present invention relates to alternators or to alternator-starters.

A vehicle alternator is known that comprises a case, a stator winding, and a solidified electrically-insulating varnish impregnating the end turns and the twisted leads of the winding so as to insulate them electrically from the adjacent case and so as to reinforce their mechanical strength. The neutral points of the winding are insulated in the same manner. Nevertheless, when subjected to the vibration due to operation, there is a major risk of the varnish being abraded and thus of the electrical insulation of the end turns, the twisted leads, and the neutral points disappearing.

U.S. Pat. No. 4,658,165 discloses a vehicle alternator in which an electrically-insulating screen is provided in the form of a separate piece extending between the stator winding and the case. That avoids the risk of abrasion. However, that patent provides for the twisted leads to be returned along the screen and complicates connection thereof.

BRIEF SUMMARY OF THE INVENTION

An object of the invention is to ensure that the insulating protection is long-lasting without complicating the connection of the twisted leads.

To achieve this object, the invention provides a vehicle alternator comprising a case, a stator winding, and an electrically-insulating element interposed between the case and the winding, the insulating element being a solid body mounted on one of the case and the winding, wherein the insulating element has at least one duct extending through an orifice in the case.

There is thus no risk of abrasion of the insulating element and as a result the protection is long-lasting.

In addition, the duct can receive a twisted lead of live outlet wires from the winding, which twisted lead is thus electrically insulated from the case where it passes through the case, e.g. at the back plate of the case. In addition, the duct can receive the twisted lead before being installed in the case, thus making it possible to guarantee the position of the twisted lead relative to the winding, e.g. a rectilinear position, prior to being received in the case.

Advantageously, the duct extends from a front face of the insulating element.

Advantageously, the duct extends so as to project from an inner side face of the insulating element towards an axis of the stator.

Thus, the duct is suitable for an arched twisted lead, i.e. one which does not leave the stator in register with a slot in the stack of laminations but is offset so as to be better placed, given the design of the electronic portion of the alternator, e.g. situated at the rear of the case.

Advantageously, the or each duct receives a live wire twisted lead of the winding.

Advantageously, the insulating element is interposed between the case and the winding radially relative to an axis of the stator.

Advantageously, the insulating element is interposed between the case and the winding axially relative to an axis of the stator.

Advantageously, the insulating element extends in register with an inner side face of the winding.

Advantageously, the insulating element has an indexing portion, in particular a stud, enabling the angular position of the stator around an axis of the stator to be identified.

Thus, the angular position of the stator about its axis is identified, making it easier to install, and guaranteeing that the twisted leads of live wires are properly positioned relative to the case, and in particular relative to the orifices therein.

Advantageously, the case has a second indexing portion, in particular a groove, suitable for cooperating with the indexing portion of the insulating element.

The invention also provides a method of manufacturing a vehicle alternator comprising a case, a stator winding, and an electrically-insulating element interposed between the case and the winding, wherein: the insulating element is supplied in the form of a solid body having at least one duct; the insulating element is mounted on one of the case and the winding; and the duct is inserted through an orifice in the case.

Advantageously, the insulating element is mounted on the winding.

Advantageously, the insulating element is mounted on the case.

BRIEF DESCRIPTION OF THE DRAWINGS

Other characteristics and advantages of the invention will appear on reading the following description of a preferred embodiment and of a variant given as non-limiting examples. In the accompanying drawings:

FIG. 1 is a fragmentary axial section view of an alternator of the invention showing the stator and the case;

FIGS. 2 and 3 are two perspective views from above and from below of the insulating element of FIG. 1;

FIGS. 4 and 5 are two views analogous to FIG. 1 showing a variant embodiment, respectively level with one of the twisted leads of live wires and level with the neutral point; and FIGS. 6 and 7 are two views analogous to FIGS. 2 and 3, showing the insulating element of FIGS. 4 and 5

DETAILED DESCRIPTION OF THE INVENTION

With reference to FIGS. 1 to 3, the alternator 2 comprises in conventional manner a shaft of axis 5 and a case of which only a shell 4 is shown herein. The shell has a plane rear wall 6 perpendicular to the axis 5 forming a rear plate with a bearing for the shaft, and a cylindrical side wall 8 about the axis 5. The shell is closed by a cover that forms a front bearing and that is not shown. The alternator has a stator 10 comprising a stack of laminations 12 on which a winding 14 is wound. The wires of the winding are received in slots (not shown) in the stack of laminations 12 extending parallel to the axis. The winding 14 has end turns that emerge through the rear axial end of the stack of laminations 12. This winding has twisted leads 16 of live wires, in this case three such leads since the winding is a so-called "single" winding. The twisted leads 16 emerge from a rear axial end face of the winding 14.

In accordance with the invention, the alternator has an electrically-insulating element 18 which is constituted in this case by a single piece of plastics material. This element 18 is generally annular in shape about the axis 5. Its section in a plane radial to the axis 5 is in the form of a channel section defining a plane web or rear axial end wall 20 and two flanges or cylindrical side walls about the axis 5, comprising an outer flange 22 and an inner flange 24 that face each other. The insulating element 18 has three cylindrical ducts 26 extending with axes parallel to the axis 5 so as to project from the web 20 away from the flanges 22 and 24. The three ducts 26 are close to one another around the axis 5.

The outer flange 22 carries a stud 28 extending radially outwards. The side wall 8 of the shell has an inside groove 30 extending parallel to the axis 5 and suitable for receiving the stud 28 when the stator is mounted in the case. In FIG. 1, the stud 28 and the groove 30 are shown as lying in the section plane of the figure for greater clarity, however the preferred position for the stud 28 (and thus for the groove 30) is as shown in FIG. 3.

During assembly of the alternator, the stator is built and the insulating element 18 that has previously been made by molding is mounted coaxially on the winding 14, being placed over its end turns and with its three twisted leads 16 being inserted into the three ducts 26 respectively. As a result, the insulating element 18 covers the inner and outer faces and the axial end face of the end turns. The edges of the insulating element 18 come into axial abutment against the stack of laminations 12. Thereafter, the stator 10 is mounted inside the shell 4. Having the stud 28 received in the groove 30 then makes it possible to ensure that the stator 10 is properly positioned relative to the shell 4 and angularly about the axis 5 so that the twisted leads 16 and the ducts 26 are in register with orifices 32 formed through the rear wall 6 of the shell, and then penetrate through said orifices 32. Once assembly has been completed, the insulating element 18 is interposed axially between the end wall 6 and the winding 14, and radially between the side wall 8 and the winding 14. In addition, it extends in register with an inside side face of the winding. This ensures that the end turns and the twisted leads are electrically insulated from the case 4, including where they pass through the orifices 32.

In the variant of FIGS. 4 to 7, the winding 14 is identical to that of FIG. 1, except that the twisted leads 16 have been offset so as to project from the winding in a radial direction towards the axis 5. Consequently, the ducts 26 are likewise formed to project from the inner flange 24 of the insulating element 18 so as to receive the twisted leads 16 in this configuration. In addition, the live wire twisted leads 16 are six in number in this embodiment since the winding is said to be "double". There are thus also six ducts 26. The neutral points 34 of the winding 14 is shown in FIG. 5.

It is possible to mount the insulating element 18 in the shell 4 prior to fitting the stator 10 thereon.

The insulating element 18 can be built up from a plurality of parts fixed to one another prior to being fitted to the alternator.

I claim:

1. A vehicle terminator comprising
a case,
a stator winding, and
an electric-insulating element interposed between the case and the winding, the insulating element being an annular body mounted on the case,
wherein the insulating element has at least one duct extending through an orifice in the case and wherein the duct extends so as to project from an inner side face of the insulating element towards an axis of the stator and is interposed between the case and the winding radially relative to an axis of the stator.

2. An alternator according to claim 1, wherein the duct receives a live wire twisted lead of the winding.

3. An alternator according to claim 1, wherein the insulating element is interposed between the case and the winding axially relative to an axis of the stator.

4. An alternator according to claim 1, wherein the insulating element extends in register with an inner side face of the winding.

5. An alternator according to claim 1 wherein the insulating element has a first indexing portion enabling the angular position of the stator around an axis of the stator to be identified.

6. An alternator according to claim 5, wherein the first indexing portion includes a stud and wherein the case has a second indexing portion having a groove suitable for co-operating with the indexing portion of the insulating element.

7. An alternator according to claim 1, wherein the insulating element is interposed between the case and the winding axially relative to an axis of the stator.

8. An alternator according to claim 1, wherein the insulating element is interposed between the case and the winding axially relative to an axis of the stator.

9. An alternator according to claim 1, wherein the insulating element extends in register with an inner side face of the winding.

10. An alternator according to claim 1, wherein the insulating element extends in register with an inner side face of the winding.

11. An alternator according to claim 1, wherein the insulating element has a first indexing portion enabling the angular position of the stator around an axis of the stator to be identified.

12. An alternator comprising:
a case having at least one orifice;
a stator winding;
an insulating element disposed between the case and the winding;
wherein the insulating element further comprises at least one duct extending from an inside face of the insulating element along an axis defined by the stator winding.

13. An alternator according to claim 12, wherein the insulating element is interposed radially, relative to an axis of the stator, between the case and the winding.

14. An alternator according to claim 12, wherein the insulating element is interposed between the case and the winding axially relative to an axis of the stator.

15. An alternator according to claim 12, wherein the insulating element extends in register with an inner side face of the winding.

16. An alternator according to claims 12, wherein the insulating element has a first indexing portion enabling an angular position of the stator around an axis of the stator to be identified.

17. An alternator according to claim 16, wherein the first indexing portion includes a stud and wherein the case has a second indexing portion having a groove suitable for co-operating with the indexing portion of the insulating element.

18. An alternator comprising:
a case having at least one orifice;
a stator positioned within the case, the stator defining a stator axis;
a winding wound on the stator;
an insulating element interposed, radially relative to the stator axis, between the case and the winding, the insulating element having a first indexing portion enabling an angular position of the stator around the stator axis to be identified, the first indexing portion including a stud; and at least one duct extending from the insulating element through an orifice in the case, and wherein the case has a second indexing portion having a groove suitable for co-operating with the indexing portion of the insulating element.

19. An alternator according to claim 18, wherein the at least one duct extends from an inside face of the insulating element along the stator axis.

20. An alternator according to claim 19, further comprising at least one live wire twisted lead of the winding received by the at least one duct.

21. An alternator according to claim 18, wherein the insulating element extends in register with an inner side face of the winding.

22. An alternator comprising:

a case having at least one orifice;

a stator positioned within the case, the stator defining a stator axis;

a winding wound on the stator;

an insulating element interposed, radially relative to the stator axis, between the case and the winding;

at least one duct extending from an inside face of the insulating element along the stator axis through an orifice in the case; and at least one live wire twisted lead of the winding received by the at least one duct, wherein the twisted lead are offset so as to project from the winding in a radial direction towards the stator axis.

23. An alternator comprising:

a case;

a stator winding; and an electrically-insulating element interposed between the case and the winding, the insulating element being an annular body mounted on the case, the insulating element having at least one duct extending through an orifice in the case, wherein the winding further comprises an arched twisted lead.

* * * * *

UNITED STATES PATENT AND TRADEMARK OFFICE
CERTIFICATE OF CORRECTION

PATENT NO. : 6,628,023 B1
DATED : September 30, 2003
INVENTOR(S) : Laurent Paquet It is certified that error appears in the above-identified patent and that said Letters Patent is hereby corrected as shown below:

Title page,
Item [73], Assignee, change "Valeo Equipment Electriques Moteur" to -- Valeo Equipements Electriques Moteur --.

Column 3,
Line 56, delete the word "terminator" and substitute the word -- alternator --.
Line 59, delete the word "electric-insulating" and substitute the words -- electrically-insulating --.

Column 4,
Line 52, delete the word "claims" and substitute the word -- claim --.

Signed and Sealed this

Sixteenth Day of November, 2004

JON W. DUDAS
*Director of the United States Patent and Trademark Office*